United States Patent [19]
Sauber

[11] 3,802,722
[45] Apr. 9, 1974

[54] SAFETY CHAIN BOLT

[76] Inventor: Charles J. Sauber, Box 61, Virgil, Ill. 60182

[22] Filed: Oct. 19, 1972

[21] Appl. No.: 298,858

[52] U.S. Cl............ 280/457, 24/201 SL, 280/179 A
[51] Int. Cl................................................ B60d 1/12
[58] Field of Search........ 280/457, 461, 497, 415 R, 280/515, 504, 511, 433, 179 A; 292/57, 59, 60, 61, 62, 264; 24/201 SL, 201 LP

[56] References Cited
UNITED STATES PATENTS

| | | | |
|---|---|---|---|
| 3,341,226 | 9/1967 | Broun | 280/457 |
| 3,464,720 | 9/1969 | Abromavage | 280/457 |
| 1,479,709 | 1/1924 | Goldstein | 292/57 X |

Primary Examiner—Leo Friaglia
Assistant Examiner—Randall A. Schrecengost
Attorney, Agent, or Firm—N. M. Esser

[57] ABSTRACT

A bolt arrangement for securing safety chain is provided with end stanchions and an intermediate stanchion through which the bolt is slidably and rotatably mounted. The safety chain is trapped by the bolt between an end stanchion and the intermediate stanchion. The bolt is operated by a plurality of operators rotatably and slidably mounted thereto between the other end stanchion and the intermediate stanchion, and comprises a plurality of flat pieces, each shaped and drilled to be mounted about the bolt and positioned side by side between a set of snap rings. Only by partially rotating all the handles together can they be slid laterally between two guides parallel to the bolt to free the chain from the bolt.

8 Claims, 4 Drawing Figures

PATENTED APR 9 1974  3,802,722

SAFETY CHAIN BOLT

This invention relates in general to safety devices and more particularly to a bolt type assembly for securing safety chains such as are required for mobile trailers attached by ball joint or other hitch mechanisms to automotive vehicles.

It is accordingly the principal object of this invention to provide an effective bolt arrangement for quickly securing or releasing safety chains to or from trailers hitched to automotive vehicles. The bolt device is quickly operable to attach and detach safety chains, yet positive in securing and maintaining the safety chain in place.

It is another object of this invention to provide a bolt arrangement for securing safety chains in which the bolt is itself rotatable and its handle or operator is also rotatable relative to the bolt and of more than one piece.

These and additional objects and advantages will become more apparent as the ensuing description proceeds, taken in conjunction with the accompanying drawings in which.

Figure 1:
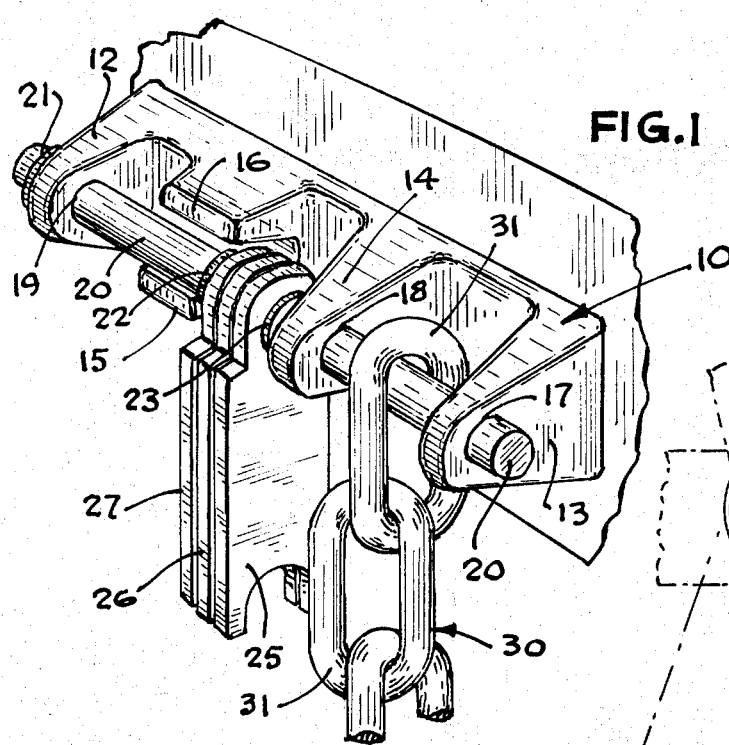
FIG. 1 is a perspective view of the safety chain bolt arrangement with a chain link secured therein.
Figure 2:
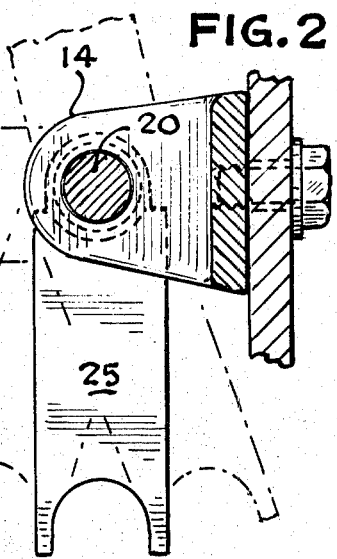
FIG. 2 is an end view of FIG. 1 looking from the right.
Figure 3:
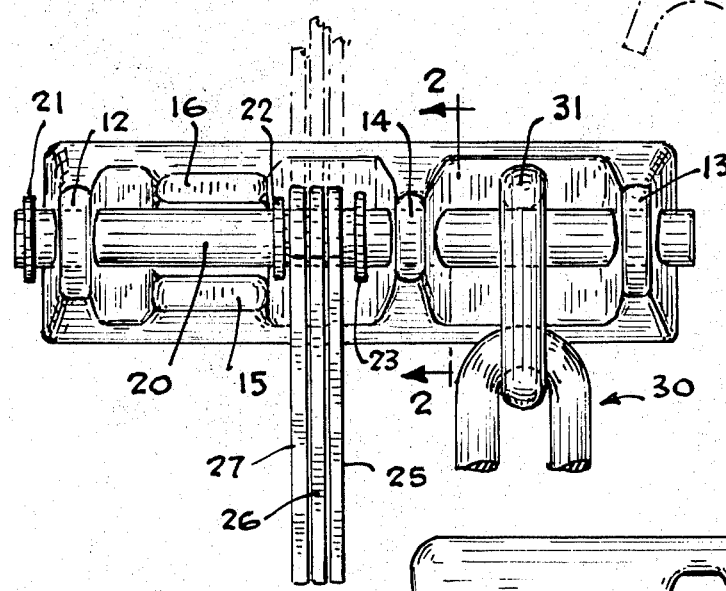
FIG. 3 is an elevational view of FIG. 1.

Referring now more particularly to the drawings and particularly to FIG. 1, numeral 10 designates a fixture which may comprise a metal casting but preferably is a steel forging so that the fixture 10 may be secured as by welding to the hitch framework secured to the motor vehicle or otherwise to a secure element of the motor vehicle.

Fixture 10 comprises a base 11, end stanchions 12 and 13 respectively, and a third stanchion 14 intermediate end stanchions 12 and 13. Between end stanchions 12 and intermediate stanchion 14 there are two guide flanges 15 and 16 of lesser height than the stanchions. The guide flanges 15 and 16 are spaced apart, parallel to one another, and at right angles to the stanchions 12 and 14 and are disposed therebetween.

Base 11 may be suitably drilled and tapped to receive threaded bolts 11a to secure the fixture 10 to the hitch supports or to the vehicle rather than by welding.

Figure 4:
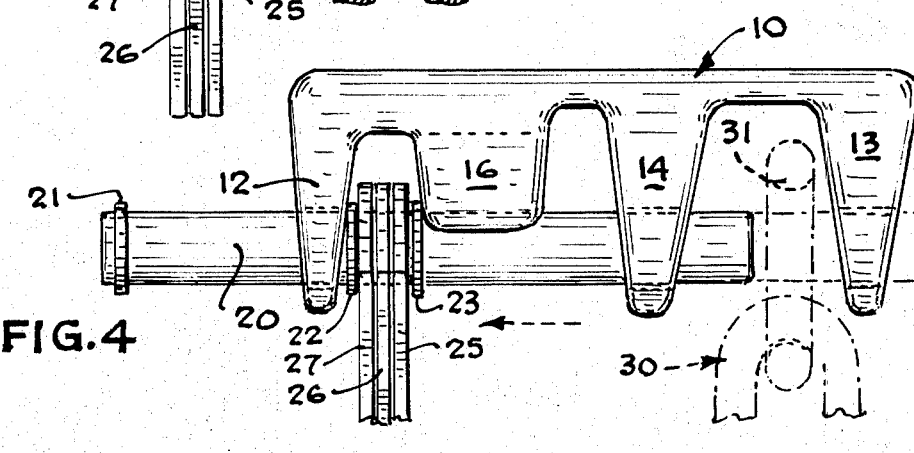
FIG. 4 is a plan view of FIG. 1.

The upstanding ends of the stanchions are provided with in-line through bores 17, 18 and 19 respectively, to mount rotatably and slidably bolt member 20. Bolt 20 is held captive therewithin by snap rings 21, 22 and 23 as seen in FIG. 4. The snap rings 22 and 23 are dimensioned to clear the pathway formed by the parallel guide flanges 15 and 16. Between the snap rings 22 and 23 there are mounted the bolt handles or operator elements for limited arcuate movement about the bolt 20. The preferred embodiment has three such handles or operator elements 25, 26 and 27, mounted for limited rotational movement about the bolt 20, although a plurality are deemed sufficient to provide safe operation. These operator elements are so shaped that their captive ends about the bolt are slidable laterally together with their retaining snap rings 22 and 23 and the bolt between guide flanges 15 and 16 when partially rotated, preferably about 90°, and moved between parallel flanges 15 and 16 to the left, as seen in FIGS. 1 and 4, opening the bolt between the major stanchions 13 and 14 to receive or release a link 30 of safety chain 31. The free ends of operator elements 25, 26 and 27 are each provided with a semi-circular contour for simultaneous manipulation by a single finger if desired, when the contoured ends are in alignment.

It has been discovered that having a plurality of operator or handle elements such as 25, 26 and 27 provides virtually impossible odds that a jar or jolt would permit all three of the operators or handles 25, 26 and 27 from being in alignment with the parallel guide flanges 15 and 16 at the same time simultaneously with a lateral force vector which might cause bolt 20 to be moved to the left as seen in FIGS. 1 and 4, to accidentally release the safety link 31 from its captive position. Moreover, movement of the chain when trapped, as by bouncing for example, does not move the bolt because it is rotatable.

Having described my invention in detail, modifications may be suggested to those skilled in the art. All such modifications within the scope of the appended claims are deemed to be covered.

I claim:

1. A bolt arrangement for securing safety chains comprising a plurality of stanchions provided with boreholes, means rigidly connecting said stanchions, a bolt mounted for slidable and rotatable movement within said boreholes adapted to trap or release a link of the chain between two of said stanchions, handle means for said bolt mounted for limited rotation about the bolt and for limited longitudinal movement of the bolt, said handle means comprising a plurality of handle elements adjacent one another, each captively secured and each being independently rotatable on the bolt.

2. Bolt arrangement according to claim 1, in which the handle elements are held captive longitudinally of the bolt by snap rings.

3. Bolt arrangement according to claim 2, in which a keyway is provided between the two stanchions between which the handle elements are slidable.

4. Bolt arrangement according to claim 2, in which the handle elements are so shaped at their captive ends about the bolt and arranged to be slidable in said keyway at a preselected position of all the handle elements to thereby open or close the bolt.

5. Bolt arrangement according to claim 1, in which the handle means comprise flat sided members located side by side on the bolt.

6. Bolt arrangement according to claim 5, in which the flat sided handle members are provided at their free ends with a contour for manipulation by a single finger.

7. Bolt arrangement according to claim 1, in which the means connecting the stanchions is tapped to receive bolts to secure the fixture to a vehicle or hitch means attached to a vehicle.

8. Bolt arrangement according to claim 1, in which the fixture including the base and stanchions is integral and comprises a steel forging suitable for welding to steel members secured to the motor vehicle.

* * * * *